United States Patent [19]

Aldridge et al.

[11] Patent Number: 4,826,376

[45] Date of Patent: May 2, 1989

[54] LOCK NUT AND METHOD FOR MAKING SAME

[75] Inventors: James H. Aldridge, Hickory Corners; Arvin H. Maitland, Leroy, both of Mich.

[73] Assignee: Slip-on Lock Nut Company, Lake Orion, Mich.

[21] Appl. No.: 908,993

[22] Filed: Sep. 18, 1986

Related U.S. Application Data

[63] Continuation-in-part of Ser. No. 789,216, Oct. 18, 1985, abandoned.

[51] Int. Cl.⁴ .............................................. F16B 39/12
[52] U.S. Cl. ................................... 411/237; 411/239; 411/433; 10/86 A
[58] Field of Search ............... 411/237, 239, 432, 433, 411/437; 10/86 A, 86 R; 74/424.8 A; 285/393

[56] References Cited

U.S. PATENT DOCUMENTS

| | | |
|---|---|---|
| 463,301 | 11/1891 | Brandner . |
| 721,023 | 2/1903 | Cosper . |
| 844,469 | 2/1907 | Prouty . |
| 875,561 | 12/1907 | Verna . |
| 996,133 | 6/1911 | Peters . |
| 1,106,096 | 8/1914 | Hunt . |
| 1,375,781 | 4/1921 | DeLong . |
| 1,432,050 | 10/1922 | Broderick ........................... 411/237 |
| 1,722,783 | 7/1969 | Basseches . |
| 1,879,421 | 9/1932 | Nalle . |
| 2,153,474 | 4/1939 | Naylor et al. . |
| 2,195,124 | 3/1940 | Skoverski . |
| 2,244,400 | 6/1941 | Miller ................................. 411/238 |
| 2,285,345 | 6/1942 | Miller ................................. 411/239 |
| 2,355,679 | 8/1944 | Roxs et al. ......................... 411/432 |
| 2,374,266 | 5/1945 | Barr .................................... 411/239 |
| 2,374,309 | 4/1945 | Roxs ................................... 411/432 |
| 2,676,509 | 4/1954 | Gratiam . |
| 2,736,227 | 2/1956 | Stroble . |
| 2,789,458 | 4/1957 | Skeisvoll . |
| 3,343,440 | 9/1967 | Jones et al. . |
| 3,431,623 | 3/1969 | Smeets . |
| 4,048,897 | 9/1977 | Price, Jr. ............................ 411/433 |

FOREIGN PATENT DOCUMENTS

| | | |
|---|---|---|
| 84958 | 6/1895 | Fed. Rep. of Germany . |
| 830717 | 1/1952 | Fed. Rep. of Germany . |
| 30851 | 3/1970 | Japan . |
| 107720 | 7/1917 | United Kingdom . |
| 122272 | 1/1919 | United Kingdom . |
| 134157 | 10/1919 | United Kingdom . |
| 397749 | 8/1933 | United Kingdom . |
| 682454 | 11/1952 | United Kingdom . |

*Primary Examiner*—Neill Wilson
*Attorney, Agent, or Firm*—Brooks & Kushman

[57] ABSTRACT

A lock nut arrangement formed of a first and second generally C-shaped nut member which are joined together in a manner allowing limited axial movement and free rotation relative to one another about the axis were two members were initially threaded to central openings. The nut assembly may be radially installed on a threaded lock and locked thereon by rotating the nut members relative to one another. A lock nut is manufactured by first forming a first and second nut blanks, axially pressing the nut blanks together, clamping the nut blanks and threading the central bore, rotating the nut blanks relative to one another a predetermined distance and slotting the nut blanks.

20 Claims, 4 Drawing Sheets

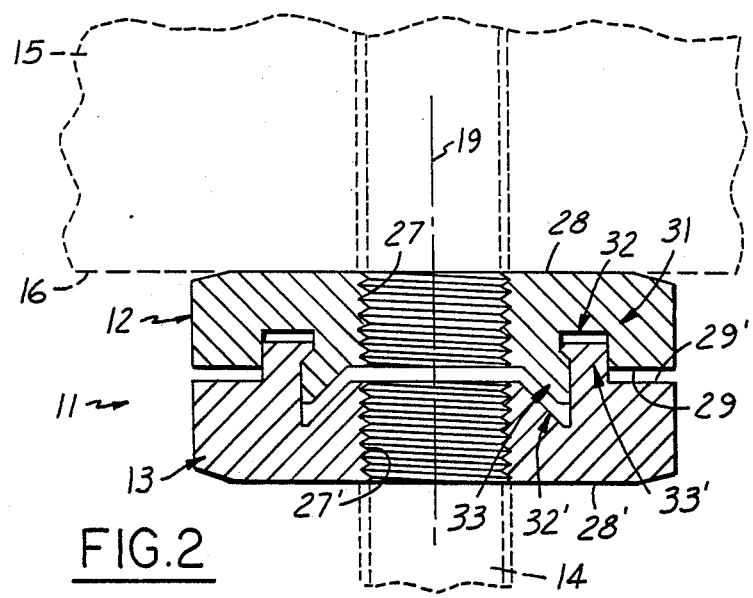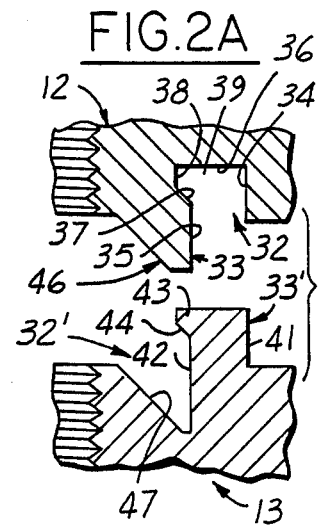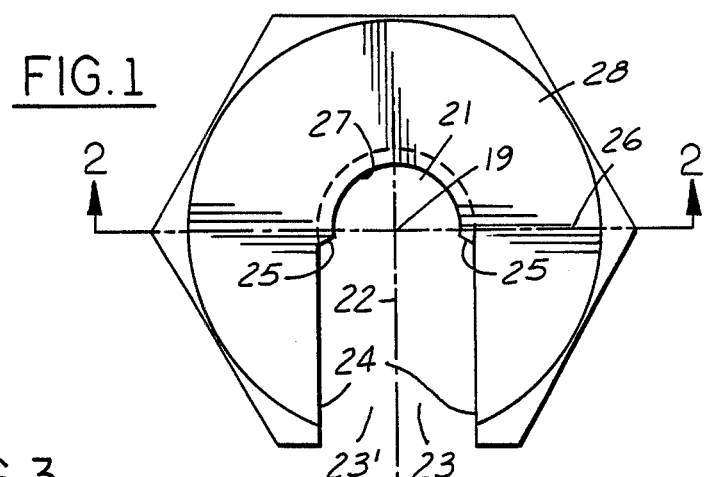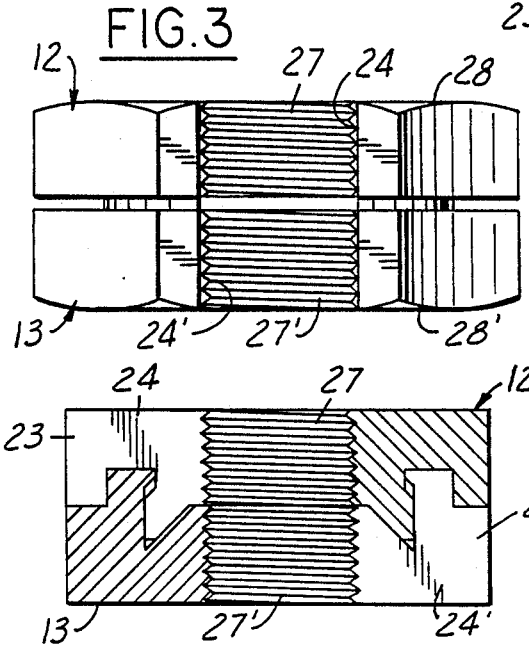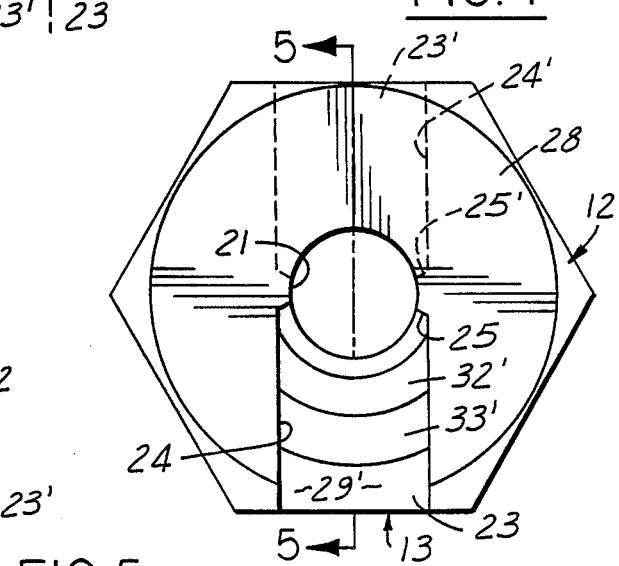

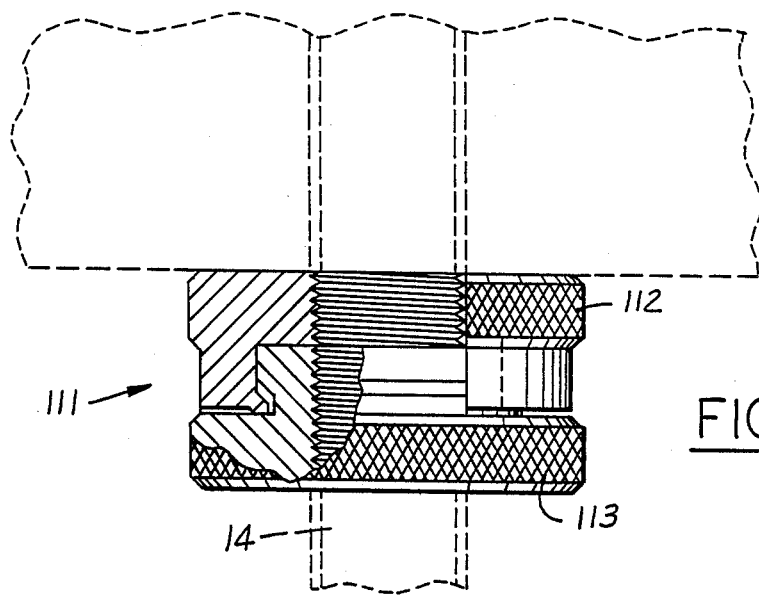
FIG.10
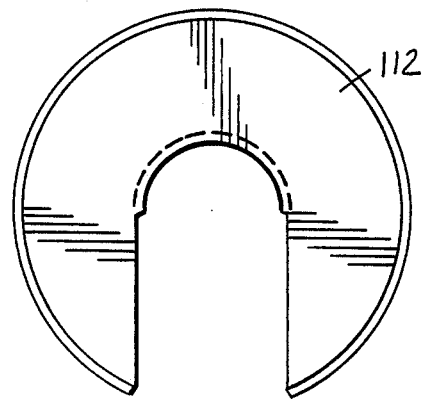
FIG.6
FIG.7
FIG.8
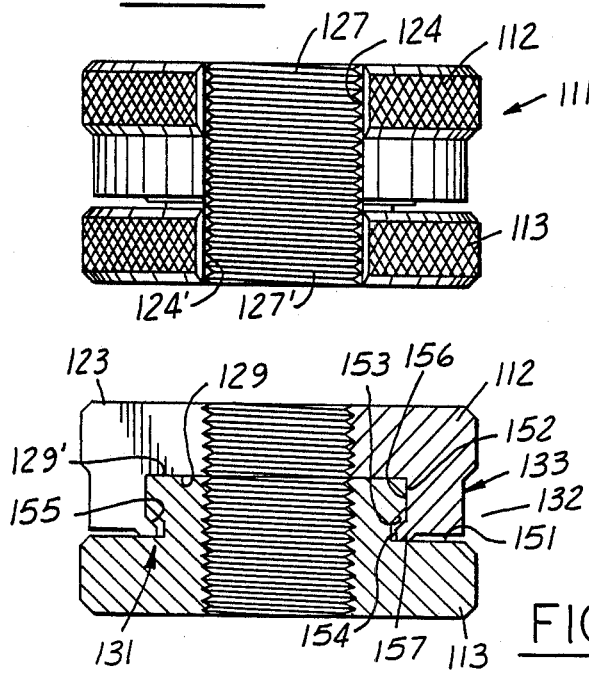
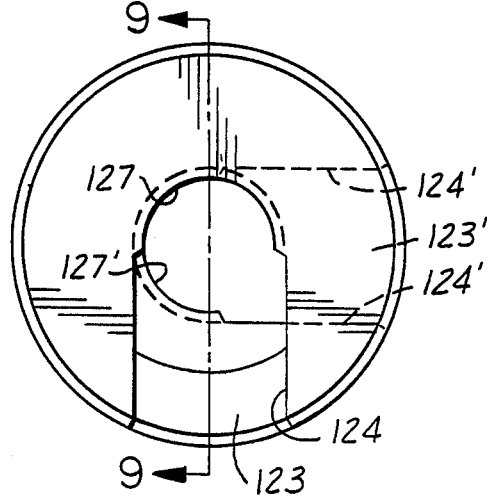
FIG.9

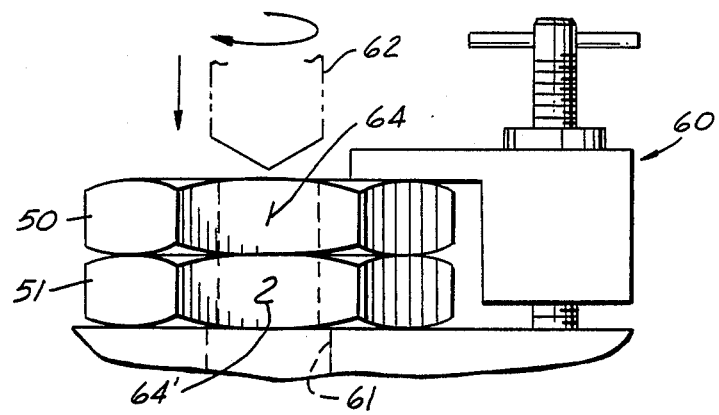
FIG. 16
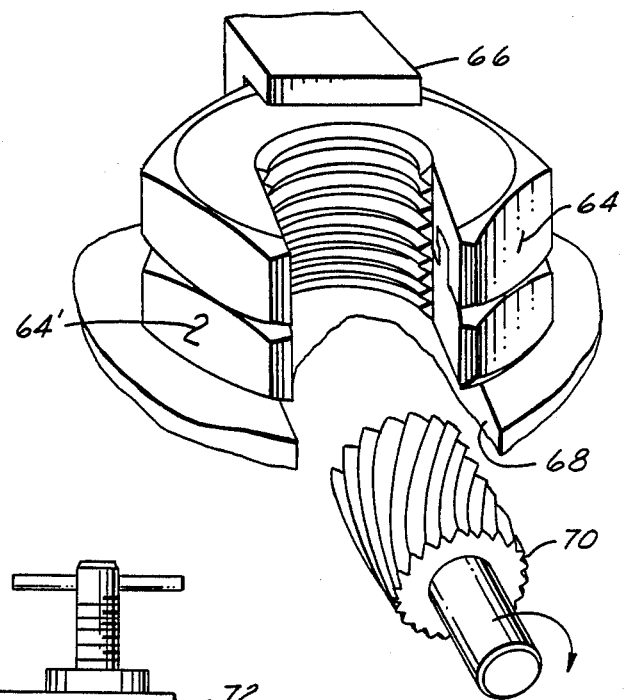
FIG. 17
FIG. 18
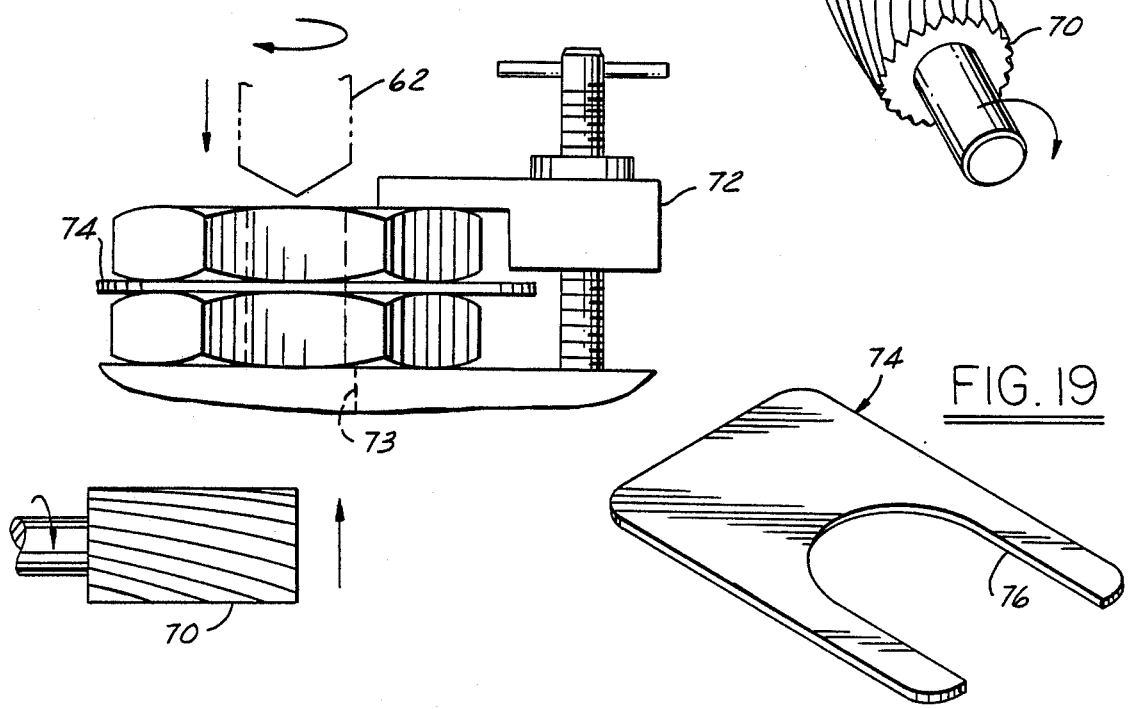
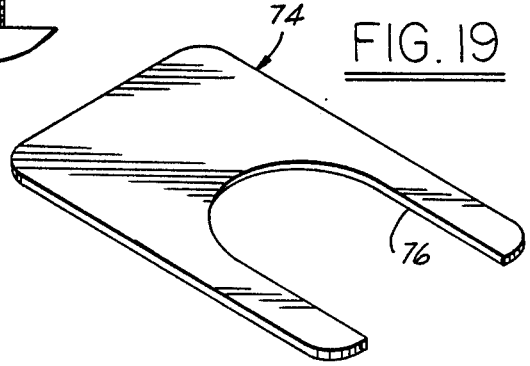
FIG. 19

LOCK NUT AND METHOD FOR MAKING SAME

RELATED APPLICATIONS

This application is a continuation in part of a patent application entitled "SLIP-ON, LOCK NUT", Ser. No. 789,216 filed Oct. 18, 1985.

FIELD OF INVENTION

This invention relates to lock nuts and methods for making lock nuts. More particularly, this invention relates to an improved lock nut arrangement which can be initially positioned on and around a threaded rod by relative transverse movement therebetween, and thereafter lockingly secured relative to the rod by relative rotation of less than one revolution.

BACKGROUND OF INVENTION

Many applications require the use of lock nut arrangements for permitting a fixed positional relationship to be established between a threaded rod and an object or article. The conventional lock nut arrangement involves threading a first nut along the rod until reaching a position of abutting or stationary engagement with the article, and threading a second nut along the rod until it snugly abuts the first nut so as to prevent loosening of the latter. This conventional arrangement, which having been utilized for many years, nevertheless possesses well-recognized disadvantages. For example, this arrangement requires the use of two separate nuts. Further, each nut must be threaded along, in many instances, a very long axial extent of the threaded rod before reaching the desired locking position. This is obviously a laborious and time consuming operation, and in many instances it is impossible to provide proper access for the nuts on the rod, particularly in situations where the lock nuts are desired for disposition on an intermediate section of the rod.

In an attempt to provide an improved lock nut arrangement, variations have been devised which involve the use of a nut employing a captive spring, such as a gripping spring or the like. Such springs are intended to create a gripping engagement between the object and the nut, and to maintain sufficient tension to prevent loosening of the nut. Such arrangements, however, have also possessed similar disadvantages since they must be threaded over the free end of the rod and then threaded to the position of use.

Others have made two-piece lock nuts which would be installed transversely on a section of threaded rod. These devices, however, were commercially impractical since the two nuts were confusingly similar when separated. Such devices, are shown in Rox, U.S. Pat. No. 2,355,679. Others have used a single C-shaped nut as shown in Rox, U.S. Pat. No. 2,374,309 and DeLong, U.S. Pat. No. 1,375,781. However these devices unevenly load the rod threads and must rely on function or a C-shaped washer to prevent radial disengagement.

Accordingly, it is an object of this invention to provide an improved lock nut arrangement which overcomes the disadvantages associated with the conventional arrangements as briefly described above.

More specifically, it is an object of this invention to provide an improved lock nut arrangement which can be moved transversely into engagement with a threaded rod closely adjacent the desired position of use, whereby it is unnecessary to thread the lock nut arrangement onto the rod over the free end thereof.

A further object and advantage of this improved lock nut arrangement is its ability, when positioned on the threaded rod, to be moved into a locking position by relative rotation with respect to the rod of less than one revolution.

A further object of the invention is to provide an improved lock nut arrangement and method for making same which, in addition to the advantages explained above, is constructed of two nuts which are permanently joined together by a connection which permits relative rotation and limited axial displacement between the two nuts, whereby there is provided an integrated and unitary assembly which can be consistently manufactured and used in a manner similar to a single nut.

It is further an object of this invention to provide a method for simply making lock nut arrangements so that the two lock nut portions consistently locked on the shaft with proper orientation.

Other objects and purposes of the invention will be apparent to persons familiar with structures of this general type upon reading the following specification and inspecting the accompanying drawings.

SUMMARY OF INVENTION

The improved lock nut arrangement of this invention employs first and second nut members which are disposed closely axially adjacent one another and have an axially interfitting rib-and-groove arrangement therebetween. This interfitting rib-and-groove arrangement permits unrestricted relative rotation of the first and second nuts with respect to one another in concentric relationship to the common longitudinal axis of the nut, and at the same time the nuts through a very small distance which is preferably less than the thread pitch. This interfitting rib-and-groove structure, however, prevents axial separation of the nuts so that they remain permanently joined together so as to function as a unitary arrangement. The nuts have threaded openings extending axially therethrough, and a slot opens radially of each nut from the periphery inwardly for communication with the respective threaded opening. The slot has a width which equals or slightly exceeds the diameter of the threaded opening, and the radial centerline of the slot intersects the axis of the threaded opening so that the threaded opening, due to its intersection with the slot, defines an arcuate threaded wall which extends through an angle of about 180°. With the slots aligned one over the other, the nut arrangement is positioned so that the mouths of the slots are directly adjacent the threaded rod at the desired point of use, whereupon the nut arrangement is moved transversely on the rod so that the threaded rod engages the arcuate threaded walls associated with the two nut members. Thereafter one nut member is rotated relative to the other nut member through a fraction of a revolution, such as one-half revolution, thus causing the slots to be non-aligned so that the nut arrangement totally surrounds and captivates the rod. This relative rotation, and the threaded engagement between the nut and the rod, causes the two nuts to be relatively axially moved toward one another and to effect a compressive locking engagement between the two nuts. Removal of the lock nut arrangement can be easily effected by reversing the above-described sequence.

BRIEF DESCRIPTION OF THE DRAWINGS

FIG. 1 is a top view of a preferred embodiment of the lock nut arrangement of this invention, the nut being illustrated in its released position.

FIG. 2 is a central sectional view of the lock nut as taken substantially along line 2—2 in FIG. 1.

FIG. 2A is an exploded sectional view illustrating the rib-and-groove structure which cooperates between the two nuts of the lock nut arrangement.

FIG. 3 is a front view of the lock nut arrangement shown in FIG. 1.

FIG. 4 is a top view similar to FIG. 1 but showing the nut arrangement in its locked position.

FIG. 5 is a sectional view taken substantially along line 5—5 in FIG. 4.

FIG. 6 is a top view of a second embodiment of the lock nut arrangement, the latter being shown in its released position.

FIG. 7 is a front view of the lock nut shown in FIG. 6.

FIG. 8 is a top view similar to FIG. 6, but showing the lock nut its locked position.

FIG. 9 is a sectional view taken along line 9—9 in FIG. 8.

FIG. 10 is a partially-sectioned front view similar to FIG. 7 but showing the nut in its locked position.

FIG. 16 is a side view of the two nut blanks during the tapping operation.

FIG. 17 is a perspective view of the two nut blanks held during the slotting operation.

FIG. 18 is a side view of two nut blanks being pressed together during an alternative combined tapping and slotting operation.

FIG. 19 is a perspective view of a spacer shown in use in FIG. 18.

Figure 11:
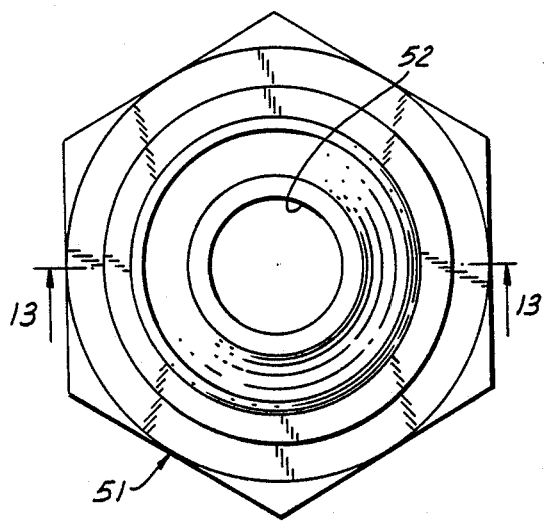
FIG. 11 is a top view of a nut blank prior to assembly.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the nut assembly and designated parts thereof. Said terminology will include the words specifically mentioned, derivatives thereof, and words of similar import.

DETAILED DESCRIPTION OF THE PREFERRED EMBODIMENT

Referring to FIGS. 1-5, there is illustrated a preferred embodiment of a lock nut unit or arrangement 11 according to the present invention. This lock nut unit 11 includes first and second nut members 12 and 13, respectively, which members will hereinafter be respectively referred to as the upper and lower members for convenience in description relative to their position in the drawings. The lock nut unit 11 is illustrated in FIG. 1 in association with a threaded rod 14, the latter projecting from an object or article 15 so as to permit the lock nut arrangement to cooperate with a surface 16 on the article. The threaded rod 14 and article 15 are represented by dotted lines in FIG. 1 for convenience in illustration.

Considering the first or upper nut member 12, it has a central opening 21 therethrough concentric with the central longitudinal axis 19 of the nut member. A slot 23 is formed in the nut member 12, which slot 23 is formed in the nut member 12, which slot extends axially through the complete thickness of the nut member and projects radially inwardly from the outer periphery thereof for communication with the central opening 21. This slot 23 extends radially of the nut member so that its centerline 22 intersects the axis 19. The slot 23 is defined between parallel side walls 24, which side walls are spaced apart by a distance which is at least equal to and preferably is just slightly greater than the diameter of the threaded rod 14 and threaded opening 21. These side walls 24 project radially inwardly of the nut to a point which is close to but preferably just short of the central diametral plane 26, whereupon these side walls 24 terminate in inner walls or shoulders 25 which slope inwardly for communication with the side wall 27 defining the opening 21. The provision of this slot 23, and its communication with the central opening 21 being of an arcuate configuration extending through a minimum angle of at least about 180°, with this arcuate side wall 27 preferably extending through an arcuate angle which just slightly exceeds 180°, such as about 190° to about 200°. Angles less than 180° will work; however, strength will be unnecessarily reduced.

The nut member 12 has an annular flat surface 28 on the upper or outer end thereof, and has a similar annular flat surface 29 on the lower or inner end thereof.

The second or lower nut member 13 possesses substantially the same structure as the upper nut member 12 as described above, and hence corresponding parts of the lower nut member 13 have been designated by the same reference numerals used to designate the upper nut member 12 except for the addition of a prime (') thereto.

To ensure that the nut members 12 and 13 permanently coupled together so as to prevent their complete separation, while at the same time this connecting structure 31 permits unrestricted relative rotation between the nut members and also permits limited axial displacement therebetween. This connecting structure 31 basically comprises a cooperating rib-and-groove arrangement and, in fact, preferably comprises two such arrangements disposed concentrically one within the other.

As illustrated by FIGS. 2 and 2A, the connecting structure 31 includes an annular recess or groove 32 which is formed in the upper nut member 12 in concentric of this rib 33', as defined between side walls 41 and 42, is substantially equal to but preferably slightly less than the radial width of the groove 32 as defined between the opposed annular side walls 34 and 35. The rib 33' has a nose or projection 43 adjacent the free end thereof, which nose 43 projects sidewardly (that is, radially inwardly relationship to the axis 19. This annular groove 32 projects axially upwardly into the nut member from the lower surface 29 thereof, and this groove 32 is adapted to receive therein an annular rib 33' which projects axially upwardly from the upper surface 29' of the lowest nut member 13.

The connecting structure additionally includes a further annular rib 33 which is integrally formed on the nut 12 concentrically within the groove 32, which rib 33 projects axially downwardly from the lower surface 29. This latter rib 33 projects axially into an annular groove or recess 32' which is formed in the lower nut 13 concentrically within the rib 33; this latter groove 32' projecting axially downwardly from the upper end surface 29'.

The annular groove 32 is defined between outer and inner annular side walls 34 and 35, respectively, and the outer side wall 34 projects axially upwardly from the lower surface 29 and terminates at a substantially flat bottom wall 36 of the groove. The inner side wall 35, however, does not project the full axial depth of the groove, but rather projects only partially of the groove and terminates at a sloped annular side wall or shoulder 37, the latter being sloped radially inwardly toward the central axis 19 as it continues to project axially upwardly. This sloped shoulder 37, at its other end, terminates in an inner annular side wall 38 which is concentric with the side wall 35 but spaced radially inwardly thereof. This inner side wall 38 then projects axially upwardly for joining with the flat bottom wall 36. This results in the slot 32, adjacent the inner or closed end thereof, having a radially inwardly projecting nose or undercut portion 39, whereby the slot 32 hence has a substantially L-shaped cross section.

The rib 33', which projects into and is confined within the slot 32, is defined between annular outer and inner side walls 41 and 42, respectively. The radial width from the side wall 42) so as to be positionable within the nose portion 39 of the groove. This nose 43 has a sloped wall or shoulder 44 on the underside thereof. The axial dimension or thickness of this nose 43 is less than the axial height of the groove nose portion 39 so as to provide axial clearance in the groove, as illustrated by FIG. 2, to permit limited axial displacement between the nut members 12 and 13.

The rib 33 has an outer annular wall 35 which also defines the inner annular wall of the groove 32. The rib 33 also has a sloped inner wall 46 which projects axially downwardly and slopes radially outwardly toward the free and of the rib. The opposed groove 32' is similarly configured in that it has an inner wall 47 which is appropriately sloped downwardly and outwardly as it projects axially inwardly of the nut, whereby the opposed walls 46 and 47 are of similar slopes. The groove 32' has an outer annual wall which is defined by the wall 42.

With the nuts 12 and 13 fitted together as illustrated by FIG. 2, the rib 33' projects axially into the groove 32 and is freely rotatably supported therein, and similarly the rib 33 projects into the groove 32; and is freely rotatably supported therein. Due to the provision of the nose 43 on the rib 33', and its confinement within the nose portion 39 of the groove 32, the surface 44 abuts the shoulder 37 and prevents axial separation of the nut members, whereby the nut members remain permanently connected together so as to form a unitary arrangement for convenience in handling. However, as noted above, nose 44 has an axial dimension which is less than the height of the groove nose portion 39, and hence the nut members 12 and 13 have a permissible but limited axial displacement therebetween. When the surface 44 abuts the shoulder 37 as illustrated by FIG. 2, the nut members 12 and 13 are in a spaced relationship corresponding to the released or unlocked position of the lock nut arrangement. In this position, the opposed surfaces 29 and 29' are spaced apart, the upper surface of the rib 33' is spaced downwardly from the bottom wall 36 of groove 32, and the opposed tapered walls 46 and 47 are also spaced apart. In this embodiment, this spacing preferably corresponds to an axial dimension equal to approximately one-third to one-half of an axial thread pitch.

However, the two nut members 12 and 13 can, as explained below, be moved axially toward one another until the latter-mentioned surfaces substantially abut one another, this latter position being illustrated by FIG. 5 and corresponding to the locked position of the lock nut arrangement. Preferably, the two nut members will have threaded arcuate side walls 27 and 27' of approximately the same axial length as shown. If the nuts have significantly different thread contact areas, excessive stress limitations would limit the maximum applied torque on the two nuts. The two nuts will also preferably have equal axial height on their peripherial edge as shown, so as to provide ample contact area for a wrench or the like for tightening same.

To utilize the lock nut arrangement 11, the arrangement is initially positioned such that the slots 23 and 23' are aligned directly one over the other substantially as illustrated by FIG. 1 and 3. The arrangement 11 is then positioned directly adjacent the threaded rod 14 at the desired location, and then moved transversely relative to the rod so that the rod 14 moves radially inwardly through the slots 23, 23' for engagement with the threaded walls 27, 27'. To ensure that the threaded walls 27 and 27' properly meshingly engage with the external thread on the rod 14, the nut members 12 and 13 are initially maintained in their axially spaced relationship as illustrated by FIG. 1. Since the threaded walls 27 and 27' to individually meshingly engage the external thread of the rod 14, the nuts will properly align themselves with the rod so that their respective threads mate (i.e., in proper phase). With the slots of the nuts aligned and the threads engaged in phase with the rod, the surfaces 29 and 29' will be between 1/6 to ⅓ a thread pitch apart, preferably ¼ of a thread pitch.

Once the lock nut arrangement has been moved transversely into engagement with the threaded rod 14 as explained above so the threads are in phase, and assuming that the upper surface 28 on the upper nut is substantially engaged with the bottom surface 16 of the object 15, then the upper nut 12 is maintained in a non-rotatable condition, and the lower nut 13 is manually rotated through approximately one-half revolution toward the upper nut member 12. This one-half revolution of the lower nut 13, and its engagement with the threaded rod 14, causes the lower nut member 13 to advance axially upwardly along the threaded rod 14 through an axial distance equal to approximately one-half the thread pitch. The nuts may be designed so that 1/6 to ⅓ of a rotation is required before the two surfaces 29 and 29' engage one another. A preferred distance is ¼ of a rotation since after the two surfaces contact one another the nuts are typically tightened further within the elastic limits of the nuts and the rod. The ¼ dimension results in a ¼ rotation orientation as shown in FIG. 4 when fully tightened.

After this one-half revolution of the lower nut 13, the rib 33' has advanced upwardly into the groove 32 throughout substantially its full depth, and simultaneously the rib 33 has relatively moved downwardly into the groove 32' so as to cause the opposed tapered surfaces 46 and 47 to securely wedgingly contact one another and hence effect a secure and rigid connection of the nuts 12 and 13. Whenin this latter secured and locked position, the slots 23 and 23' are oriented in substantially diametrically opposed relationship, substantially as illustrated by FIG. 4 and 5, and hence this results in the nut creating a secure threaded engagement with the rod 14 over a full 360° angular extent.

When released of the lock nut is desired, the reverse sequence is employed in that the lower nut 13 is reversely rotated through one-half revolution so that the slots 23 and 23' are again aligned, following which the complete nut arrangement can be moved transversely relative to the rod so as to disengage the latter.

With the lock nut arrangement 11 as described above, the nut members 12 and 13 always remain joined together so as to permit handling and manipulating thereof in a manner similar to that associated with a single nut, with two hands being required for operation only when it is necessary to relatively rotate the nuts into the locking or unlocking position.

Method of Making a Lock Nut

A lock nut of the type shown in FIG. 1–5 to be manufactured in a consistent manner using the method hereinafter described.

Figure 12:
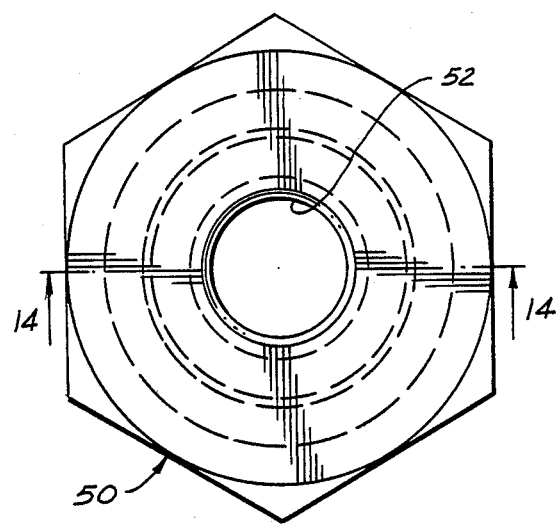
FIG. 12 is a top view of the opposite nut blank prior to assembly.
Figure 13:
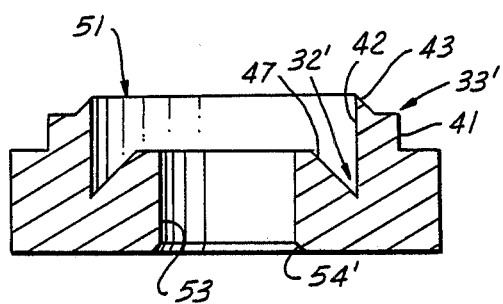
FIG. 13 is a cross-sectional side view taken along line 13—13 of FIG. 11.
Figure 14:
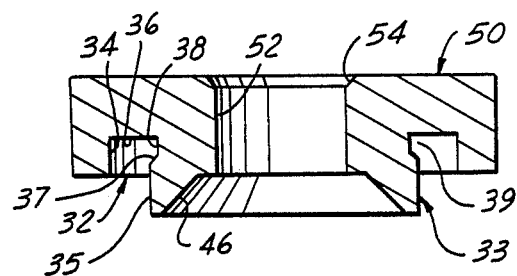
FIG. 14 is a cross-sectional side view taken along line 14—14 of FIG. 12.

The first step of the method is the forming of a first nut blank 50 as shown in FIG. 12 and 14. The nut blank is preferably formed using a turning operation such as machining on a lathe or screw machine using hexagonal bar stock. The end of the bar is machined to have a groove 32 and an undercut 39 as shown in cross-sectional view 14. After the end of the bar is turned the nut is cut off the bar stock and the operation is again repeated. The next step of the method is to form a second nut blank 51 as shown in plan view in FIG. 11 and the cross-sectional side elevation in FIG. 13. Preferably the nut blank is formed using a turning operation using the hexagonal stock. The nuts, however, could be formed using other techniques such as injection molding of plastic nuts or cold forming using a heading machine.

Figure 15:
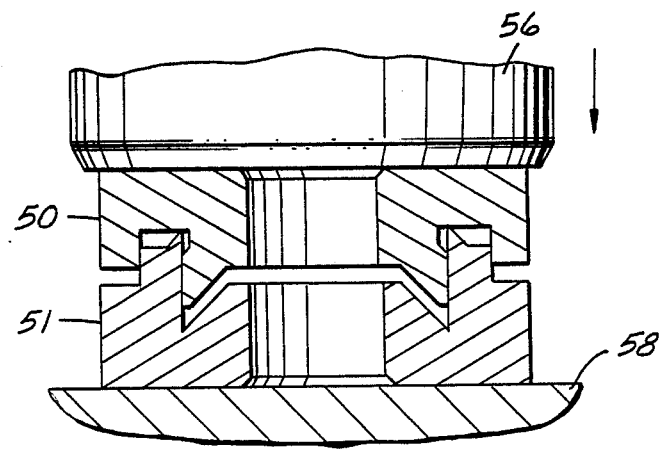
FIG. 15 is a partially cut-away side view showing the two nut blanks being pressed together.

A second nut blank is provided with a rib 33' having the formed thereon nose 43. Note that nose 43 as shown in FIG. 13 is a significantly shape that nose 43 shown in FIG. 2A since it is yet to be deformed. The first and second nut blanks 50 and 51 may be telescopically coaxially nested one within the other as shown in FIG. 15. When coaxially nested, rib 33 on a second nut blank fits within groove 32 in the first nut blank.

The next step in the method is the pressing of the two nut blanks axially together thereby causing the nose 43 of the second nut blank to deform into the undercut 39 of the first nut blank causing the two nut blanks to be securely axially retained to one another yet free to rotate relatively about the common axis. Pressing may be achieved using any conventional press mechanism such as an arbor press or the like which is schematically shown by press element 56 and base 58 in FIG. 15.

The next step in the method is the tapping of the first and second nut bores. The first and second nut blank assembly are securely clapped together to prevent relative rotation as shown in FIG. 15. The clamp mechanism is schematically shown by clamping device 60 which is provided with a clearance hole 61 adjacent the nut bore. With the two nut assemblies securely clamped together, the threads are then formed in the first and second nut blanks. This is preferably done using a rotating tap 62 which is advanced axially through the nut bores, however, threads can be machined using a number of alternative machining techniques such as thread milling thread rolling or single point thread turning. Ideally, the first and second nut blanks are marked with an alignment mark 64 and 64' as shown in FIG. 16 and aligned prior to tapping.

The next step in the lock nut forming operation is to rotate the nuts relative to one another 90° to 180° in a direction opposite that of the thread. The preferred rotation is 120° or two flats on a hex nut. For example in using a typical right hand thread which advances axially when turned clockwise, the top nut would be rotated counter-clockwise relative to the bottom nut. With the nuts in the ne orientation, they are reclamped together prior to the next step, the machining of the slot. Note it is particularly important to use the alignment marks 64 and 64' so as to properly orient the two nut blanks relative to one another. As shown in FIG. 16 the alignment marks are lined up during tapping. After the nuts are rotated to the new position prior to the slotting step as shown in FIG. 17, alignment marks are 120° apart.

The next step in the method is the machining of the slot 23 which extends through the two nut blanks. The slot machining can be achieved using numerous conventional techniques such as a common end mill 70 as shown in FIG. 17. A broach or preferably a chain broach which is ideally suited to machine the slot in high volume production. Note the clamping device 66 shown in FIG. 17 is provided with a slot 68 to allow clearance for the slot machining tool. After the slot is machined, the nut is essentially completed. It may be desirably to additionally conduct a deburring operation to remove sharp edges and a plating step to minimize corrosion. The nut can be electro-chemically plated using common techniques and adequate plating coverage is achieved even in the region between the two nut members.

The preferred embodiment of the invention shown in the drawings and described is a right-hand threaded nut, i.e., advances axially when turned clockwise. It is clearly within the scope of the invention to make a left-hand threaded lock nut using the same technique, however, the nuts will be rotated in the counter-clockwise direction between the tap and sliding step.

ALTERNATIVE METHOD

An alternate method of forming a lock nut is additionally described and is shown in FIG. 18 and 19. The nuts are first formed and pressed as described above and shown in FIGS. 11–15. Rather than having separate tapping, rotating and slotting steps. The tapping and slotting is done in a single position. The nut blanks are actually spaced apart and clamped using a spacer 74 as shown in FIG. 18. The general shape of the spacer is shown in FIG. 19 and the spaced is provided with a U-shaped opening for insertion into the gap between the first and second nut blanks prior to clamping. The spacer has a thickness falling within the range of 1/6 to ½ a thread pitch. Preferably, the spacer is ⅓ of the thread pitch. With the spacer inserted between the two nut blanks, the nut blanks are clamped axially together using a clamping means 72 as shown in FIG. 18. Clamp 72 is provided with a clearance slot 73 to allow the tap 62 and the end mill 70 to pass therethrough. After the nut blank assembly is securely clamped the threading step is then completed following by the slotting step without any relative rotation of the nuts. The nut blank assembly is then removed from the clamping device and the spacer 74 extracted. Similar to the method described above, a deburring step and a plating step may be subsequently added if desired. Also note that it could be possible to machine the slot prior to tapping. However, if a conventional tap is to be used excessive bending loads may occur.

ALTERNATE LOCKNUT EMBODIMENT

FIG. 6-10 illustrate an alternate embodiment of the lock nut arrangement 111 according to the present invention. Accordingly, corresponding parts of this alternate embodiment have been designated by the same reference numerals utilized in FIG. 1-5 except that the reference numerals have been increased by 100.

The lock nut arrangement 111 again utilizes first and second nut members 112 and 113, the latter being joined together by an appropriate connecting structure 131 which permits relative rotation, but permits only limited relative rotation, but permits only limited relative axial displacement, whereby the members 112 and 113 remain permanently axially joined together. In this arrangement 111, however, the connecting structure 131 basically comprises a single interfitting rib-and-groove arrangement.

As illustrated, the lower nut member 113 has a groove 132′ which projects downwardly from surface 129′ and opens radially outwardly through the outer periphery of the nut member, whereby the groove 132′ is defined by a bottom wall 151 and an inner annular side wall 152. This latter wall 152 projects downwardly from surface 129′ through only a partial depth of the groove, and terminates in an inwardly sloped wall or shoulder 153, and the latter joins to the further inner annular side wall 154 which projects downwardly for junction with the bottom wall 151. This results in the groove 132′ having a sidewardly projecting nose portion 155, thereby in effect defining a substantially L-shaped groove.

The upper nut member 112 has an annular rib 133 which projects axially downwardly from the bottom surface 129 thereof. This rib 133 is positioned adjacent the outer periphery of the upper nut member, and projects downwardly into the groove 132. Rib 133 has an inner annular wall 156 which externally surrounds and is substantially rotatably supported on the annular wall 152. The rib 133 has, adjacent the free end thereof, an inwardly projecting nose or projection 157, the latter projecting into the nose portion 155 of the groove. This projection 157, like the projection 43 described above relative to FIG. 1-5, has an axial dimension less than the height of the groove nose portion 155, and hence permits limited axial displacement between the nut members 112 and 113. However, it prevents total axial separation between the nut members. Note that the axial separation between the nuts is related to the amount of rotation between the nuts relative to one another between the tapping and sliding steps. If the nuts are to be rotated ⅓ of a turn, i.e., 120°, then the total axial separation should be at least ⅓ of an axial thread pitch so as to allow the nut blanks to separate axially a sufficient distance so that the threads may properly engage a threaded rod when installed radially thereon.

In this embodiment, the surfaces 129 and 129′ are normally axially spaced apart when the nut arrangement is in a released position by an axial distance equal to about one-fourth the axial thread pitch. In this released position, the slots 123 and 123′ are aligned as illustrated in FIG. 6, whereby the nut can be moved sidewardly (i.e., transversely) to surround the threaded rod 14. With the arcuate threaded walls 127 and 127′ engaged with the external threads on the rod 14, the upper nut member 112 is held stationary, and the lower nut member 113 rotated approximately one-fourth revolution so that the nut assumes the locked position illustrated by FIGS. 8-10. During this one-fourth revolution, the lower nut 112 is axially fed upwardly due to its threaded engagement with the rod 14, and hence the surfaces 129 and 129′ come into secure abutting engagement with one another so as to effectively lock the nuts together in engagement with the threaded rod. Further, since the slots 123 and 123′ are angularly spaced at a 90° interval as illustrated by FIG. 8, the threaded rod is hence captivated since the nuts effectively define a cylindrical surface which closely approaches a totally closed envelope in surrounding relationship to the rod.

The nut arrangement 111 preferably has the nuts formed as cylindrical members, rather than of conventional hexagonal configuration as illustrated by FIGS. 1-5, and the cylindrical exterior periphery of the nut members 112 and 113 is preferably knurled. This facilitates use of this embodiment in an environment where the nut is engaged or released solely due to manual gripping engagement, whereby use of tools is not required.

The nose 43 (or 157) is preferably formed integrally with its rib, and initially projects axially outwardly from the rib end surface. The two nut members are then axially fitted together and subjected to axial compression, whereupon the nose is deformed sidewardly into the nose portion of the groove.

Swivel Joint and Method of Forming Same

A swivel joint may be formed in a similar manner to that used in forming a locking nut. In the fabrication of a swivel joint, however, the threading and slotting steps are omitted. A first blank is formed similar to nut blank 50 shown in FIG. 12 and 14. The blank may be hexagonal having a flat upper surface as shown in 12 and 14 or the blank could alternatively be of a different shape such as that of a fluid coupling or the like provided, however, that the blank has formed therein a groove 32 and an undercut 39 as shown in cross-sectional view 14. The blank is preferably formed using a turning operation as previously described in relationship to the lock nut and method of forming same. The second blank is then formed corresponding to second nut blank 51 shown in FIG. 11 and 13. The blank may be generally hexagonal as shown or may be of a different shape provided the blank has formed on one end thereof a raised annular rib 33′ having upwardly projecting therefrom a deformable annular nose 43. The first and second blanks may be telescopically, coaxially nested one within the other as shown in FIG. 15. While coaxially nested, the two blanks are axially pressed together causing the annular nose 43 to deform axially and radially inwardly causing the nose to occupy a portion of undercut 39 in the first blank. The swivel joint is then complete The first and second blanks being axially affixed to one another to allow limited axial movement while preventing the complete separation and free rotation of the first and second blanks relative to one another along their common axis. Swivel joints of this construction provide a simple inexpensive coupling useful in a wide variety of mechanical applications.

Although particular preferred embodiments of the invention have been disclosed in detail for illustrative purposes, it will be recognized that variations or modifications of the disclosed apparatus and method, including the rearrangement of parts and steps, lie within the scope of the present invention.

We claim:

1. A lock nut comprising:
   first and second generally C-shaped nut members, each having an internally threaded axial bore portion and a slot projecting radially from said bore portion, said nut members further provided with connection means for axially connecting the nut members to permit free relative rotation and limited axial displacement therebetween while preventing the total separation thereof.

2. The invention of claim 1 wherein said threads of the first and second members are in phase when said nuts have their slots aligned and are axially separated from one another 1/6 to ½ of a thread pitch.

3. The invention of claim 1 wherein said first and second nut members are provided with a concentric groove on one member and a corresponding concentric rib on the other member for telescopically corresponding with one another to limit radial movement therebetween while allowing a free rotation about the bore axis.

4. The invention of claim 3 wherein said connection means further comprises an undercut groove formed in one said nut members and a corresponding concentric nose for cooperating therewith formed in the other nut member to thereby limit axial displacement therebetween preventing complete separation.

5. The invention of claim 4 wherein said threaded axial bore has threads formed therein extending over 180° to 220° of the bore surface.

6. The invention of claim 2 wherein said threaded axial bore has threads formed therein extending over 180° to 200° of the bore surface.

7. The invention of claim 6 wherein said threaded axial bore of both nut members have approximately equal axial thread lengths.

8. The invention of claim 1 wherein said first and second nut members are provided with a peripherial edge having means for gripping the nut members formed thereon.

9. The invention of claim 8 wherein said first and second nut members have approximately equal axial lengths at the peripheral edge.

10. The invention of claim 1 wherein:
    said threads of the first and second nut members are in phase when said nuts have their slots aligned and are axially spaced 1/6 to ½ of a thread pitch;
    each of said nut members having threads extending over 180° to 200° of the bore surface and approximately equal axial thread lengths; and
    said first and second nut members further are provided with a groove on one nut member and a corresponding rib on the opposite nut member which telescopically interlock with one another.

11. The invention of claim 1 wherein the first and second members may be rotated relative to one another with a thread rod while cooperating between an unlock position where their respective slots are aligned, and a lock position where the nut members axially contact one another, have their threads generally aligned and in phase, and have their slots oriented approximately 180° apart, thereby securely attaching to the threaded end.

12. The method of making a lock nut comprising the following steps:
    forming a first and second nut member blank each having a central axis and means for axially connecting the blank together;
    pressing the first and second nut blanks together while coaxially arranged, causing deformation to occur, thereby interlocking the two nut blanks together, enabling limited axial movement and free relative rotation therebetween;
    machining a tapped hole through the two nut blanks while said blanks are clamped together;
    rotating the first nut member 1/6 to ½ of a revolution relative to the second nut member in a direction opposite the direction of the machine threads when viewing the first nut member along the central axis; and
    machining a slot in the two nut members while clamped together, said slot extending radially outward from threaded hole to the periphery of said nut members to form two generally C-shaped interlocked nut members.

13. The invention of claim 12 wherein said step of forming a first and second nut member blanks further comprises the steps of forming a first nut member blank having a circumaxial recess formed therein, and forming a second nut member blank having a corresponding circumaxial rib projecting therefrom sized to telescopically insert within a recess in the second nut member blank.

14. The invention of claim 13 further comprising the step of deburring the lock nut assembly to remove sharp edges.

15. The invention of claim 14 further comprising the step of the electro-chemically plating the lock nut assembly to provide anti-corrosive coating.

16. The method of making a lock nut comprising the following steps:
    forming a first and second nut member blank each having a central axis and means for axially connecting the blank together;
    pressing the first and second nut blanks together while coaxially arranged, causing deformation to occur, thereby interlocking the two nut blanks together, enabling limited axial movement and free relative rotation therebetween;
    inserting a spacer between the first and second nut members to axially separate them apart 1/6 to ½ of a thread pitch;
    machining a tapped hole through the two nut blanks while said blanks are clamped together; and
    machining a slot in the two nut members while clamped together, said slot extending radially outward from threaded hole to the periphery of said nut members to form two generally C-shaped interlocked nut members.

17. The invention of claim 16 further comprising a step of unclamping said nut members and removing the spacer inserted therebetween.

18. The invention of claim 16 further comprising the step of deburring the lock nut assembly to remove sharp edges.

19. The invention of claim 16 further comprising the step of electro-chemically plating the lock nut assembly to provide anti-corrosive coating.

20. The invention of claim 17 wherein said step of forming a first and second nut member blank further comprises the steps of forming a first nut member blank having a circumaxial recess formed therein and forming a second nut member blank having a corresponding circumaxial rib projecting therefrom sized to telescopically insert within a recess in the second nut member blank.

* * * * *

UNITED STATES PATENT AND TRADEMARK OFFICE
CERTIFICATE OF CORRECTION

PATENT NO. : 4,826,376

DATED : May 2, 1989

INVENTOR(S) : James H. Aldridge, Arvin H. Maitland

It is certified that error appears in the above-identified patent and that said Letters Patent is hereby corrected as shown below:

```
Column 1,  Line 6,    delete "," after --"SLIP-ON--

Column 5,  Line 44,   "and" should be --end--

Column 8,  Line 14,   "ne" should be --new--

Column 8,  Line 33,   "desirably" should be --desirable--

Column 8,  Line 56,   "spaced" should be --spacer--

Column 12, Line 31,   delete "the" after --of--
```

Signed and Sealed this

Twelfth Day of June, 1990

Attest:

HARRY F. MANBECK, JR.

*Attesting Officer*   *Commissioner of Patents and Trademarks*